United States Patent [19]

Richard

[11] 4,188,608
[45] Feb. 12, 1980

[54] FISH DETECTION APPARATUS

[76] Inventor: Joseph D. Richard, 3613 Loquat Ave., Miami, Fla. 33133

[21] Appl. No.: 916,704

[22] Filed: Jun. 19, 1978

[51] Int. Cl.² ............................................. G01S 9/70
[52] U.S. Cl. ..................................... 367/93; 367/116
[58] Field of Search ..................... 340/3 C, 3 R, 1 R

[56] References Cited

U.S. PATENT DOCUMENTS

| | | | |
|---|---|---|---|
| 2,721,987 | 10/1955 | Richard, Jr. | 340/3 R |
| 3,417,369 | 12/1968 | Richard | 340/3 R |
| 3,706,068 | 12/1972 | Bradshaw et al. | 340/3 R |
| 3,793,618 | 2/1974 | Plangger | 340/3 R |

*Primary Examiner*—Richard A. Farley

[57] ABSTRACT

A seabed referenced fish detection system for detecting aquatic animals within a predetermined zone relative to the bottom of a body of water. Preferably, fish are detected within a predetermined zone contiguous with the bottom without the need for range switching to accommodate changes in depth. A pair of ultrasonic pulses are transmitted, preferably of different frequencies, and separated by a predetermined time delay. The bottom echo from the first ultrasonic pulse initiates a gate interval during which echoes from the second ultrasonic pulse are detectable. When the time delay and the gate interval are equal, the gate interval terminates immediately before the reception of the second bottom echo, so that only echoes from above the bottom, e.g., fish echoes, can trigger an audible output signal. Since fish detection events are un-ambiguously indicated by an audible signal, the need for a graphic recorder or C.R.T. to distinguish and interpret fish and bottom echoes is eliminated.

8 Claims, 8 Drawing Figures

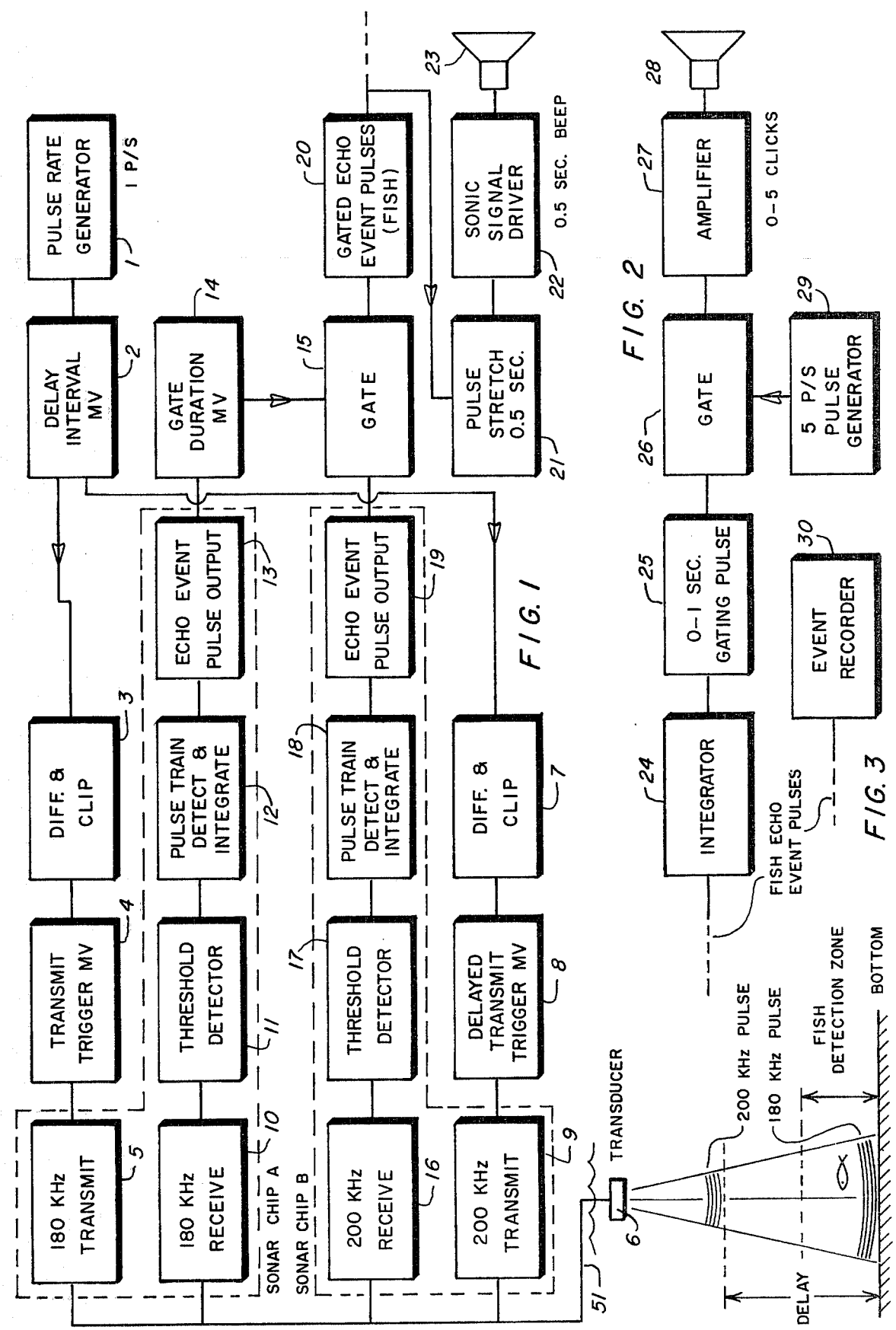

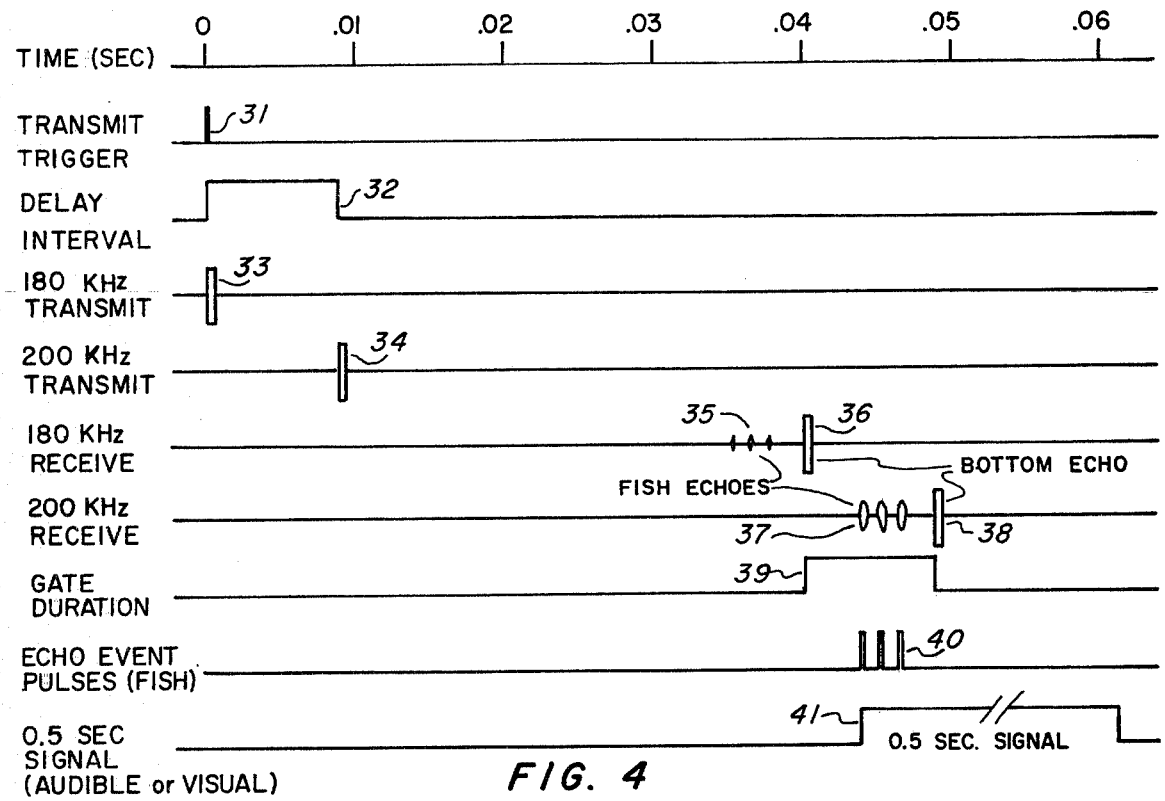
FIG. 4
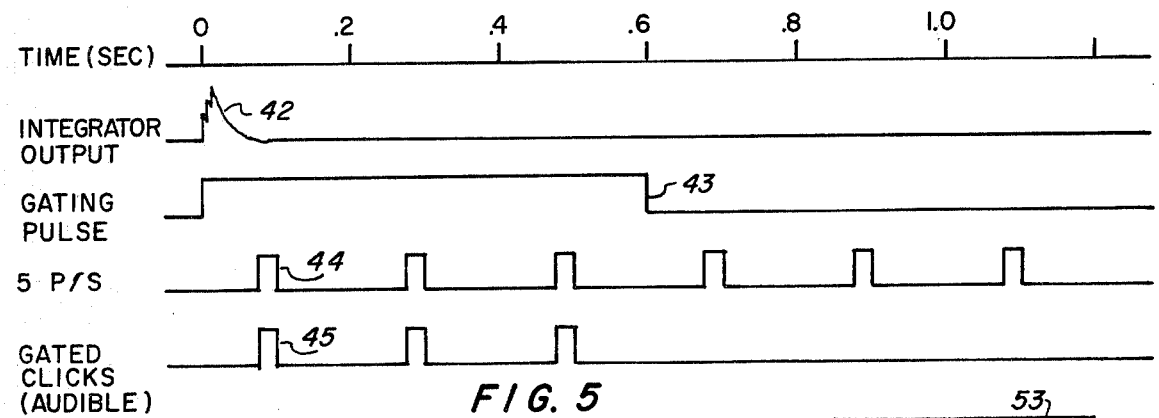
FIG. 5
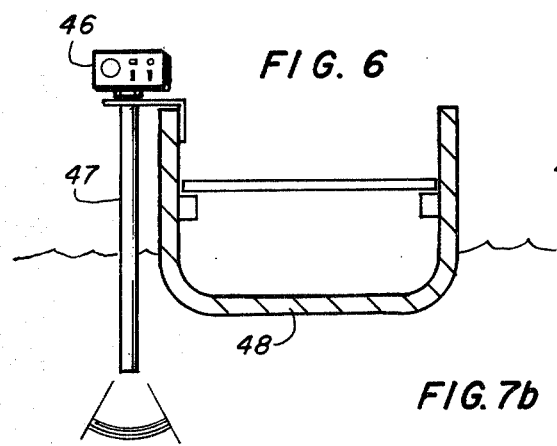
FIG. 6
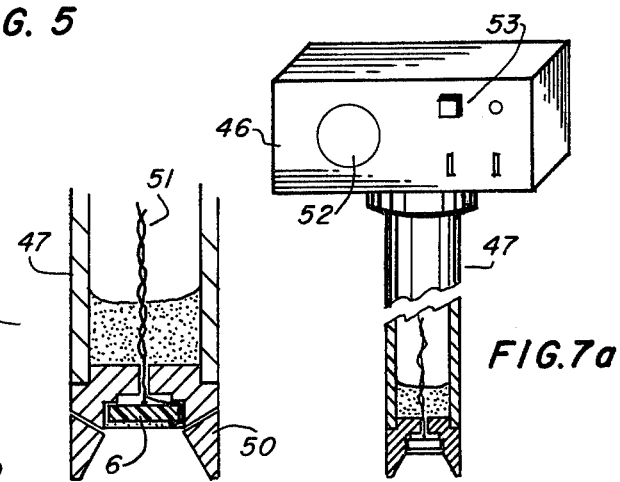
FIG. 7a
FIG. 7b

FISH DETECTION APPARATUS

BACKGROUND OF THE INVENTION

In the past, a variety of ultrasonic instruments have been devised for the detection and localization of fishes. Usually, pulse echo techniques have been used wherein pulses of acoustic energy are repetitively transmitted, and the presence of, and distance to, fish or other reflectors is indicated by the amplitude and time delay characteristics of returning echoes as indicated on a graphic recording medium or other visual display. Where bottom fishes are of particular interest, it is desirable to selectively display only the echoes from the depth zone immediately adjacent the bottom. Previously, a method has been available for automatically scanning and recording fish echo signals from the depth zone contiguous with the bottom, regardless of depth changes. This technique has been called seabed lock (or seabed referenced) echo sounding. However, such systems used in the past require the use of complex recording and indicating techniques and are far too expensive and fragile to be used by fishermen of modest means fishing from small open boats. Therefore the purpose of the present invention is to overcome these and other limitations of the prior art, so that, for the first time, ultrasonic fish detection apparatus with bottom zone selectivity can be made available for use by the small scale (artisanal) fishermen of the poorer developing countries.

SUMMARY OF THE INVENTION

The present invention provides a method and means for detecting fishes or other aquatic animals in a body of water within a predetermined zone above the bottom, including the zone contiguous with the bottom, regardless of depth changes. This is accomplished without the use of expensive graphic or CRT recording or complex signal storage techniques, and without even the need for manual range switching to accommodate changes in depth. The method described herein utilizes the transmission of a pair of ultrasonic pulses separated by a predetermined time interval, and preferably of different frequencies, wherein the first pulse is utilized to sense the position of the bottom and the second pulse is utilized to obtain echo signals from objects (e.g. fishes) above the bottom. The bottom echo resulting from the first pulse is used to initiate a gate interval which temporarily allows subsequent echoes resulting from the second pulse to be detected and indicated. Thus the present invention provides a fish detection method and apparatus which can be totally solid state, and which therefore can be made waterproof, shockproof and otherwise durable. Such apparatus can be produced at a small fraction of the cost of any previously available apparatus having a seabed referenced fish detection capability. A preferred operation uses a low pulse repetition rate extremely conservative of battery power. Fish detection events are indicated by a simple audible (or visual) signal requiring no interpretation. Since range switching or other manual operations are not necessary, the apparatus can be operated by illiterate or untrained fishermen.

BRIEF DESCRIPTION OF THE DRAWINGS

FIG. 1 is a block diagram of a fish detection system according to the present invention. For simplicity, two monolithic integrated circuits are used, each of which comprises a complete ultrasonic transceiver.

FIG. 2 shows one method by which multiple fish echoes (as detected by the apparatus of FIG. 1) can be audibly indicated as a series of discrete clicks.

FIG. 3 shows an optional event recorder for graphically recording fish detection events as provided by the apparatus of FIG. 1.

FIG. 4 shows the time relationship of a typical pulse sequence and resulting echoes during the operation of the fish detection system shown in FIG. 1.

FIG. 5 shows the time relationship between a group of closely spaced fish echoes and the resulting series of spaced out audible clicks as provided by the apparatus shown in FIG. 2.

FIG. 6 shows a preferred configuration of the fish detection system attached to a boat or dugout canoe.

FIG. 7b shows a sectional view of an ultrasonic transducer suitable for use with the apparatus shown in FIG. 1.

FIG. 7a is a partially sectional and schematic view of a fish detection system according to the present invention.

DESCRIPTION OF THE PREFERRED EMBODIMENT

In FIG. 1, a pulse generator 1 is shown for providing repetitive trigger pulses to the delay interval multivibrator 2. The positive and negative output pulses from the delay interval multivibrator 2 are differentiated and clipped by circuits 3 and 7 respectively to provide an undelayed transmit trigger to the transmitter 5 and a delayed transmit trigger to the transmitter 9 by means of transmit trigger multivibrators 4 and 8 respectively. Thus at time zero, a 180 kHz ultrasonic pulse is transmitted into the water by means of the transducer 6, and at the end of the delay interval, a 200 kHz ultrasonic pulse is transmitted. For example, a time interval of 0.008 second, as shown by the delay interval pulse 32 of FIG. 4, separates the two transmitted pulses. Echoes resulting from the first transmitted ultrasonic pulse are received by the receiver 10 and processed by the threshold detector 11, the pulse train detector 12, and the echo event pulse output 13. Thus when a 180 kHz ultrasonic echo above a predetermined threshold is received by the receiver 10 (i.e. resulting from a bottom echo), an output pulse from the echo event pulse output 13 triggers the gate duration multivibrator 14. In a preferred mode of operation the gate duration multivibrator 14 is disabled during the delay interval. The sensitivity of the threshold detector 11 is set so that only bottom echoes, and not the much weaker fish echoes, result in the triggering of the gate duration multivibrator 14. The gate 15 is opened by the output pulse of the gate duration multivibrator 14. For example, when triggered, the gate duration multivibrator 14 enables the gate 15 to pass pulses from the echo event pulse output 19 for a period of 0.008 second. Echoes resulting from the transmission of the delayed 200 kHz ultrasonic pulse are received by the receiver 16 and processed by the threshold detector 17, the pulse train detector 18, and the echo event pulse output 19. For the brief time duration when the gate 15 is open (e.g., 0.008 second as shown by the gate duration pulse 39 in FIG. 4), output pulses indicative of received 200 kHz echoes are passed from the echo event pulse output 19, through the gate 15, to trigger uniform pulses 40 (indicative of fish) by means of the pulse generator circuit 20. The first of any such uniform pulses indicative of fish is stretched by the pulse stretcher 21 to drive the sonic signal driver 22 and transducer 23 to provide a signal of adequate duration for audibility. Obviously, if several pulses resulting from fish echoes are passed during the brief gating period, an equal number of stretched audible signals could not be made coincidently audible. Therefore additional circuitry is needed, as in FIG. 2, to space out a series of audible signals to indicate multiple fish echoes resulting from the transmission of a single 200 kHz ultrasonic pulse.

FIG. 2 shows a pulse integrator 24 for integrating a series of uniform pulses indicative of fish from the pulse generator 20. The gating pulse generator 25 opens the gate 26 for a time duration dependent on the number of pulses integrated. When the gate 26 is open, pulses from the 5 P/S pulse generator 29 are passed to the amplifier 27 which results in audible clicks from the transducer 28. For example, when three uniform pulses indicative of fish are integrated, the gating pulse duration is about 0.6 second so that three consecutive pulses (at 5 pulses/second) are passed to the amplifier 27. The resulting 3 clicks are therefore spaced out for clear audibility and the occurrence of multiple fish echoes can be thus indicated. The time sequence of these events can be seen more clearly in FIGS. 4 and 5. FIG. 3 shows an event recorder 30 which can be used as an alternative method for indicating the occurrence of 200 kHz fish echoes during the period when the gate 15 is open.

FIG. 4 shows the time relationship of the pulse sequence typical of the operation of the apparatus of FIG. 1. The transmit trigger pulse 31, from the pulse rate generator 1, initiates a delay interval pulse 32 of about 0.008 second duration. A 180 kHz ultrasonic pulse 33 is transmitted coincident with the initiation of the delay interval 32, and a delayed 200 kHz ultrasonic pulse 34 is transmitted coincident with the termination of the delay interval 32. Thus the 200 kHz pulse follows about 12 meters behind the 180 kHz pulse. Echoes resulting from the transmitted 180 kHz ultrasonic pulse 33 include fish echoes 35 and a bottom echo 36. Echoes resulting from the transmitted delayed 200 kHz ultrasonic pulse 34 include fish echoes 37 and the bottom echo 38. The gate duration pulse 39 is, in effect, triggered by the reception of the 180 kHz bottom echo 36. The trigger level of the gate duration multivibrator 14, which generates the gate duration pulse 39, is set relatively high so that the much weaker fish echoes 35 are below the trigger threshold. When the gate duration pulse 39 is selected to be of the same duration as the delay interval 32, the gate period will terminate coincident with the reception of the 200 kHz bottom echo. If the gate duration pulse 39 is made shorter than the delay interval 32, the gate period will terminate before the 200 kHz bottom echo is received. Therefore only echoes from above the bottom, i.e., from fishes, will result in pulses passing through the gate 15 if the gate duration 39 is equal to, or less than, the delay interval 32. Three of such pulses 40, indicative of fish, result from the reception of the 200 kHz fish echoes 37. The first of such pulses, indicative of a fish, triggers the 0.5 second audible (or other) signal. For the example shown in FIG. 4, the fish detection zone adjacent the bottom is half the distance between first and second transmitted ultrasonic pulses, i.e., about 6 meters.

FIG. 5 shows the time relationship of the pulse sequence typical of the operation of the apparatus of FIG. 2. A series of uniform pulses indicative of fishes, such as the pulses 40, are integrated to provide an output 42 proportional to the number of fish echoes received from a single 200 kHz ultrasonic pulse transmission. The gating pulse 43 is generated having a duration proportional to the integrator output 42. Pulses 44, generated at a rate of 5 per second, are passed to the amplifier 27 only for the duration of the gating pulse 43. Accordingly, three spaced out audible pulses (e.g., clicks) are generated to indicate the reception of three 200 kHz fish echoes resulting from a single 200 kHz ultrasonic pulse transmission.

FIG. 6 shows a sectional view of a small boat or dugout canoe 48 with the fish detection apparatus 46-47 of the present invention mounted on a bracket attached to one side.

FIG. 7a shows a partially sectioned view of the fish detection apparatus 46-47 showing a housing 46, preferably waterproof, with audible indicator 52 and optional visual indicator 53. FIG. 7b shows an ultrasonic transducer 6, mounted within the end piece 50, and connected to the electronics (e.g., as shown in FIG. 1), by means of connecting leads 51. Air vents are shown in the end piece 50 to prevent air entrapment on the face of the transducer 6.

Much of the circuitry shown in FIG. 1 can be combined in monolithic integrated circuits. Specifically, two "sonar chips" can be used to perform essentially all functions of the 180 kHz and the 200 kHz transceivers. For example, the LM 1812 ultrasonic transceiver, a monolithic integrated circuit produced by National Semiconductor Corporation, is well suited for these purposes.

A method and apparatus has been described for detecting fish within a predetermined zone above the bottom. The present method is uniquely adapted for very low cost production because expensive indicating or recording components are eliminated. In addition, the absence of moving parts and the optional exclusive use of solid state components allows the construction of an extremely rugged, shock proof and waterproof apparatus with a long life expectancy. Furthermore, no special training or skill is needed for the operation of the fish detector or for the interpretation of the output signals. Integral construction, as shown in FIGS. 6 and 7, eliminates the need for a cable connection between housing 46 and transducer 6 which, in the conventional echo sounder, is easily damaged and often a source of leakage into the transducer housing. Possible transducer damage while bleaching or accidental grounding is largely eliminated by the integral construction of the fish detector. This configuration also makes it convenient to remove the fish detector from the fishing boat to be carried home by the fisherman, thereby reducing the possibility of theft. Buoyant and waterproof construction can also reduce the risk of loss if the fish detector is accidentally dropped over the side at sea. Fish detection apparatus of the character described can be operated at very low pulse repetition rates, or even at single pulse pair operation, e.g., triggered by a push button, thereby using very little battery power. Prolonged operation is therefore possible even when operating on four flashlight batteries. Alternatively, a charging circuit with re-chargeable batteries can be used in conjunction with silicon, or other, photovoltaic cells to allow long term use where replacement batteries are not available.

In view of the foregoing characteristics and advantages, a fish detection system has been provided by the present invention which is uniquely suitable for use in the small artisanal fisheries of even the poorest countries.

Although the present invention is limited to a method and apparatus for detecting fish or other aquatic animals, such a device would normally be used in conjunction with a depth measuring capability. Many ultrasonic pulse echo techniques have been used in the past for measuring depth. One method compatible with the present invention is the "sing around" technique in which each bottom echo triggers the following transmission so that the pulse repetition rate, e.g., as indicated by audible clicks, provides an indication of depth. Thus, for example, a click rate of 75 Hz would indicate a depth of 10 meters and 750 Hz would indicate a depth of 1 meter, etc.

Another depth indicating method compatible with the present invention utilizes a flip-flop (i.e., a bi-stable multivibrator) which is switched on when an ultrasonic pulse is transmitted and is switched off when the bottom echo is received. For example, in FIG. 4 it can be seen that a flip-flop could be turned on coincident with the leading edge of the delay interval 32 and switched off coincident with the leading edge of the gate duration 39 to obtain an output pulse length proportional to depth. Either a single transmitted pulse or repetitive pulses can be used, but in either event, the flip-flop output is integrated with respect to time to provide a ramp voltage which rises until terminated by the reception of the bottom echo. The peak voltage from the integrator is sampled and held, and a voltage to frequency converter provides a pulse train indicative of the peak voltage. The pulse train frequency can thus sensibly indicate the depth by the repetition rate of audible clicks. For convenience, a click rate of 1 Hz could indicate a depth of one meter. 10 Hz could indicate 10 meters, and 100 Hz could indicate 100 meters depth, etc. This technique for determining depth can be used with single pulse (push button) operation or with continuous but very low repetition rate ultrasonic pulse transmissions to minimize the expenditure of battery power. Although an audible indication of depth, e.g., by click rate, is preferred to retain low cost advantages and compatibility with the fish detection apparatus, as an alternative, depth can be indicated visually by a row of light emitting diodes along a calibrated scale, or by other visual indicators, as have been variously described in the prior art.

Obviously, many alternative constructions and modes of operation could be suggested for the fish detection apparatus. Although FIG. 4 shows an operating mode in which the delay interval 32 has the same duration as the gate interval 39—thus allowing fish detection in the zone contiguous with the bottom, as an alternative the delay interval can be increased relative to the gate duration thus allowing fish detection in zones in mid-water, i.e., not contiguous with the bottom. However, the most valuable and unique capability of the present apparatus is the detection of fish in the zone immediately adjacent the bottom—the zone of maximum interest to the artisanal hook-and-line fisherman.

Although operating frequencies of 180 kHz and 200 kHz are shown as examples, other ultrasonic frequencies could be used. Although two separate frequencies are preferred for the transmitted pulse pair, it is possible to use the same frequency for both pulses. However, bottom reverberation from the first pulse obscures the fish echoes from the second pulse when the fish are near the bottom and when the bottom is rough. Obviously, a visual signal could be used instead of, or in addition to, the audible signal to indicate fish detection events. Alternatively, an event recorder could be used to provide a graphic time record of fish detection events. However, a graphic record is not needed and the areas of maximum fish abundance (e.g., where repeated multiple detection events occur) can be marked by the fisherman with small anchored floats. In FIG. 6, the fish detection apparatus 46-47 can be pivotally suspended in the bracket, and a weight attached to the lower end of the shaft 47 to maintain a vertically directed alignment of the ultrasonic beam.

In summary, the present invention provides a seabed referenced fish detection apparatus which, in the preferred configuration, is totally solid state and which therefore can be made waterproof, shock proof and otherwise durable. Such apparatus can be produced to sell for less than one-tenth the cost of any previously available apparatus having a seabed referenced fish detection capability. A preferred operation utilizes a low pulse repetition rate extremely conservative of battery power. Fish detection events are indicated by a simple audible signal requiring no interpretation. Since range switching or other manual operations are not required, the apparatus can be operated by illiterate or untrained fishermen.

I claim:
1. In an echo sounder for selectively detecting fish within a predetermined depth zone relative to the bottom in a body of water, apparatus for excluding signals indicative of bottom echoes comprising:
   means for transmitting first and second ultrasonic pulses into a body of water, said ultrasonic pulses being separated by a predetermined time delay interval;
   means for receiving ultrasonic echo signals from within the aforementioned body of water resulting from reflections of the said ultrasonic pulses;
   means for providing a gate interval initiated by the repeption of the first bottom echo from among the said received echo signals, said gate interval having a predetermined time duration not exceeding the said delay interval so that signals indicative of bottom echoes resulting from the said second transmitted pulse cannot occur during the said gate interval;
   means for selectively detecting echo events which occur during the said gate interval from among the said received echo signals; and
   means for activating a sensible signal in response to said detected echo events to indicate the presence of fish within the aforementioned predetermined zone relative to the bottom.
2. Apparatus as described in claim 1 wherein:
   said first and second transmitted pulses are further characterized by first and second ultrasonic frequencies respectively, and;
   the said means for receiving ultrasonic echo signals are further characterized by separate first and second receiving means responsive to said first and second ultrasonic frequencies respectively.
3. Apparatus as described in claim 1 wherein:
   the said sensible signal indicative of detected echo events is an audible signal having a substantially longer time duration than the said received echo signals.
4. Apparatus as described in claim 1 wherein:
   the said gate interval has a time duration substantially equal to the said time delay interval so that the said gate interval terminates in substantial coincidence with the reception of the bottom echo resulting from said second transmitted ultrasonic pulse.

5. Apparatus as described in claim 1 wherein:
the said means for activating a sensible signal in response to said detected echo events includes an event recorder for graphically registering the occurrence of such events with respect to elapsed time.

6. Apparatus as described in claim 1 wherein:
said means for activating a sensible signal in response to said detected echo events includes means for generating a plurality of spaced out discretely audible signals in response to a plurality of said detected echo events.

7. In an echo sounder for selectively detecting fish within a predetermined depth zone contiguous with the bottom in a body of water, apparatus for excluding signals indicative of bottom echoes comprising:
means for initiating a delay interval of predetermined time duration;
means for transmitting a first ultrasonic pulse vertically downward into a body of water coincident with the beginning of the said delay interval;
means for transmitting a second ultrasonic pulse of a substantially different ultrasonic frequency vertically downward into the aforementioned body of water coincident with the termination of said delay interval;
means for receiving echo signals from within the aforementioned body of water resulting from reflections of the said first transmitted ultrasonic pulse;
means for receiving echo signals resulting from reflections of the said second transmitted ultrasonic pulse;
means for initiating a gate interval of predetermined time duration in response to the reception of a bottom echo resulting from said first ultrasonic pulse transmission, said gate interval being substantially equal in time duration to the said delay interval so that signals indicative of bottom echoes resulting from the said second transmitted pulse cannot occur during the said gate interval; means for selectively detecting received echo signals resulting from said second ultrasonic pulse transmission which occur during the said gate interval; and
means for activating a sensible indicator in response to said selectively detected echo signals to indicate the presence of fish within the aforementioned zone contiguous with the bottom.

8. In an echo sounder for selectively detecting fish within a predetermined depth zone relative to the bottom in a body of water, the method for excluding signals indicative of bottom echoes comprising:
transmitting a first acoustic pulse into a body of water;
transmitting a second acoustic pulse into the aforementioned body of water, said second pulse following said first pulse by a predetermined time delay interval;
receiving echoes from within the said body of water resulting from reflections of said first and second acoustic pulses;
providing a gate interval initiated by the reception of a bottom echo resulting from said first acoustic pulse, said gate interval not exceeding the time duration of the said delay interval, said gate interval thereby being terminated before the reception of a bottom echo resulting from said second acoustic pulse so that signals indicative of such bottom echoes cannot occur during the said gate interval;
selectively detecting received echo signals resulting from said second acoustic pulse during the said gate interval; and
activating a sensible indicator in response to said selectively detected echo signals to indicate the presence of aquatic animals within the aforementioned predetermined zone relative to the bottom.

* * * * *